United States Patent
Dalton et al.

(10) Patent No.: US 9,828,227 B2
(45) Date of Patent: Nov. 28, 2017

(54) KEG COUPLER WITH SECONDARY PRESSURE REGULATOR AND SYSTEMS USING SAME

(71) Applicant: Illinois Tool Works Inc., Glenview, IL (US)

(72) Inventors: Jeffrey Travis Dalton, Menlo Park, CA (US); Kim Reeves, Menlo Park, CA (US); Joseph K. McCarthy, Tucson, AZ (US); Carey Costle, Tucson, AZ (US)

(*) Notice: Subject to any disclaimer, the term of this patent is extended or adjusted under 35 U.S.C. 154(b) by 31 days.

(21) Appl. No.: 14/990,673

(22) Filed: Jan. 7, 2016

(65) Prior Publication Data

US 2016/0200561 A1    Jul. 14, 2016

Related U.S. Application Data

(60) Provisional application No. 62/101,257, filed on Jan. 8, 2015.

(51) Int. Cl.
| | | |
|---|---|---|
| G05D 16/08 | (2006.01) |
| B67D 1/08 | (2006.01) |
| B67D 1/14 | (2006.01) |
| B67D 1/04 | (2006.01) |
| B67D 1/12 | (2006.01) |
| G05D 16/10 | (2006.01) |

(52) U.S. Cl.
CPC .......... *B67D 1/0851* (2013.01); *B67D 1/04* (2013.01); *B67D 1/0829* (2013.01); *B67D 1/0835* (2013.01); *B67D 1/1252* (2013.01); *B67D 1/14* (2013.01); *G05D 16/08* (2013.01); *G05D 16/106* (2013.01)

(58) Field of Classification Search
CPC ...... B67D 1/0851; B67D 1/04; B67D 1/0835; B67D 1/1252; B67D 1/14; G05D 16/08; G05D 16/106
See application file for complete search history.

(56) References Cited

U.S. PATENT DOCUMENTS

| 746,755 A | 12/1903 | Spencer |
| 879,604 A | 2/1908 | Wawrzinski |

(Continued)

FOREIGN PATENT DOCUMENTS

| BE | 885849 A2 | 2/1981 |
| EP | 2720105 A2 | 4/2014 |

(Continued)

OTHER PUBLICATIONS

International Search Report and Written Opinion dated May 2, 2016 for PCT/US2016/012698.

*Primary Examiner* — Atif Chaudry
*Assistant Examiner* — Kevin Barss
(74) *Attorney, Agent, or Firm* — Quarles & Brady LLP; Jiarong L. Lamiquiz

(57) ABSTRACT

A pressure regulator comprising a housing formed to include a bore therein, a piston moveably disposed within the bore wherein that piston comprises a first annular lip adjacent a first end, a spring disposed within said bore and comprising a first end and a second end, an adjustment cap moveably disposed in the bore, wherein the first end of the spring is in physical contact with the first annular lip and the second end of the spring is in physical contact with the adjustment cap.

17 Claims, 17 Drawing Sheets

(56) References Cited

U.S. PATENT DOCUMENTS

| | | | | |
|---|---|---|---|---|
| 3,129,730 A * | 4/1964 | Simon | B67D 1/0802 | 141/286 |
| 3,200,994 A * | 8/1965 | Levinson | B67D 1/0412 | 222/132 |
| 3,698,417 A * | 10/1972 | Smith | B67D 1/0802 | 137/212 |
| 3,933,282 A | 1/1976 | Stevens, Jr. | | |
| 4,364,493 A * | 12/1982 | Raynes | B67D 1/04 | 137/114 |
| 4,484,695 A * | 11/1984 | Fallon | G05D 16/0602 | 137/505.25 |
| 4,898,205 A | 2/1990 | Ross | | |
| 4,928,850 A * | 5/1990 | Fallon | B67D 1/1252 | 137/114 |
| 5,244,118 A * | 9/1993 | Fallon | B67D 1/1252 | 137/114 |
| 5,836,483 A * | 11/1998 | Disel | B08B 9/0325 | 137/212 |
| 6,874,521 B1 * | 4/2005 | Amidzich | G05D 16/065 | 137/12 |
| 7,836,911 B2 * | 11/2010 | Arnott | G05D 16/106 | 137/116.5 |
| 2006/0011664 A1 | 1/2006 | Hammond | | |

FOREIGN PATENT DOCUMENTS

| | | |
|---|---|---|
| GB | 10858 A | 0/1915 |
| WO | 2013000665 A1 | 1/2013 |

* cited by examiner

KEG COUPLER WITH SECONDARY PRESSURE REGULATOR AND SYSTEMS USING SAME

CROSS REFERENCE TO RELATED APPLICATIONS

This application claims priority from a U.S. Provisional Patent Application having Ser. No. 62/101,257, filed Jan. 8, 2015, entitled "Keg Coupler with Secondary Pressure Regulator and Systems Using Same," which is hereby incorporated herein by reference.

FIELD OF THE INVENTION

Applicants' disclosure relates to a beer keg coupler comprising an interchangeable secondary pressure regulator.

BACKGROUND OF THE INVENTION

When handled properly from brewery to bar to glass, draught beer delivers what many consider to be the freshest, most flavorful beer available to the customer. But the job does not end once the keg is tapped and the beer begins to flow. Good beer quality depends on proper alignment of various dispense variables, including an optimal pour pressure.

SUMMARY OF THE INVENTION

Applicants' keg coupler with secondary regulator takes arbitrary pressure adjustments out of the hands of people who are not familiar with, or qualified to make, those adjustments. In certain embodiments, Applicants' secondary regulator is preset for an output pressure between about 4 PSI and about 35 PSI. That preset output pressure can, however, be adjusted in the field by a professional technician. Therefore, Applicants' secondary pressure regulator is "field adjustable" such that a preset output pressure can be increased, or decreased, using Applicants' remote regulator adjustment tool.

A keg coupler comprising a secondary $CO_2$ regulator that fits into the $CO_2$ gas port of a prior art keg regulator replacing a 5/16" Tailpiece is disclosed. In certain embodiments, the regulator is set for a specific pour pressure recommended for a specific beer and adjustment requires a special tool and knowledge of how to make that adjustment. In other embodiments, the dispense pressure is variable based upon, for example and without limitation, a determined elevation, a measured atmospheric pressure, a measured external temperature of a liquid vessel, a measured temperature of the liquid passing through the keg coupler, and a measured humidity.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the system. One skilled in the relevant art will recognize, however, that the system and method may both be practiced without one or more of the specific details, or with other methods, components, materials, and so forth. In other instances, well-known structures, materials, or operations are not shown or described in detail to avoid obscuring aspects of the invention.

The invention is described herein in the context of draught beer systems. This description should not be taken as limiting. For example, trending is the practice of restaurants and bars serving complementary filtered water to patrons. The natural up-sell is to offer filtered carbonated water for $2.00 per glass (or more). Applicants' regulator 500 (FIG. 5) and regulator 700 (FIG. 7) described hereinbelow can be set at a desired carbonation level, or offer the ability to adjust carbonation up or down, to build the desired effect. The natural off-shoot of this is filtered carbonated water with fresh squeezed or pressed juices (pre or post carbonation).

As another example, an industrial off-gas can be captured and used to power a pump. Ten percent (10%) of the world's power is used to power pumps. Using Applicants' secondary regulator, the "wild" pressure of that captured off-gas can be regulated to a specific volume/pressure to power a pump, while any additional volume/pressure would bypass the system. In such embodiments, use of Applicants' secondary regulator is akin to tapping into free power.

Figure 4A:
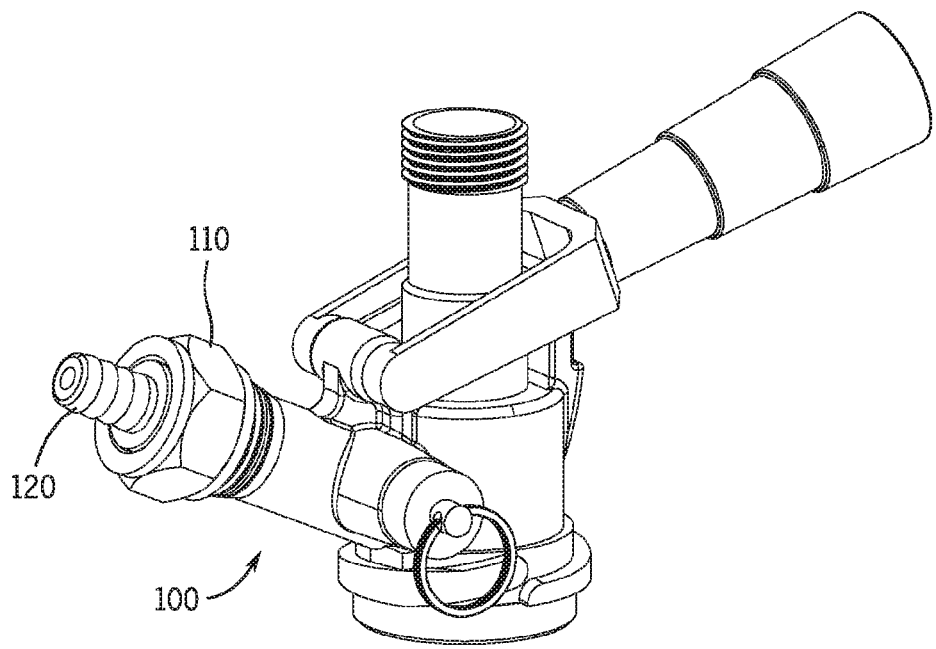
FIG. 4A illustrates a hex nut and tail piece components of keg coupler 100.
Figure 4B:
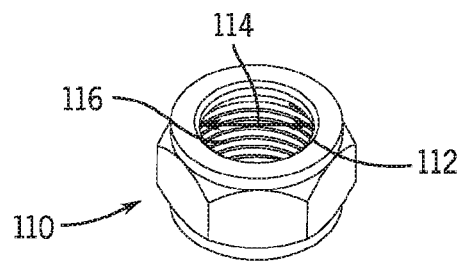
FIG. 4B illustrates hex nut 110 separately.
Figure 5A:
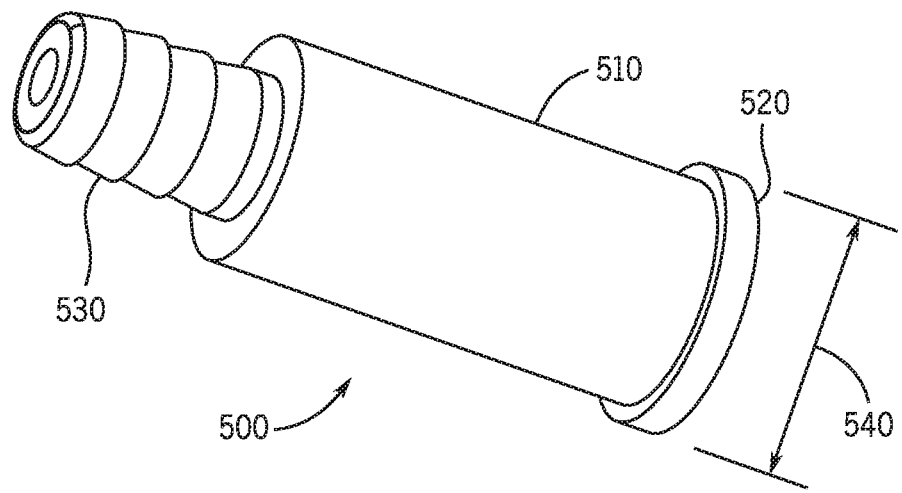
FIG. 5A is a perspective view of one embodiment of Applicants' secondary regulator 500.
Figure 5B:
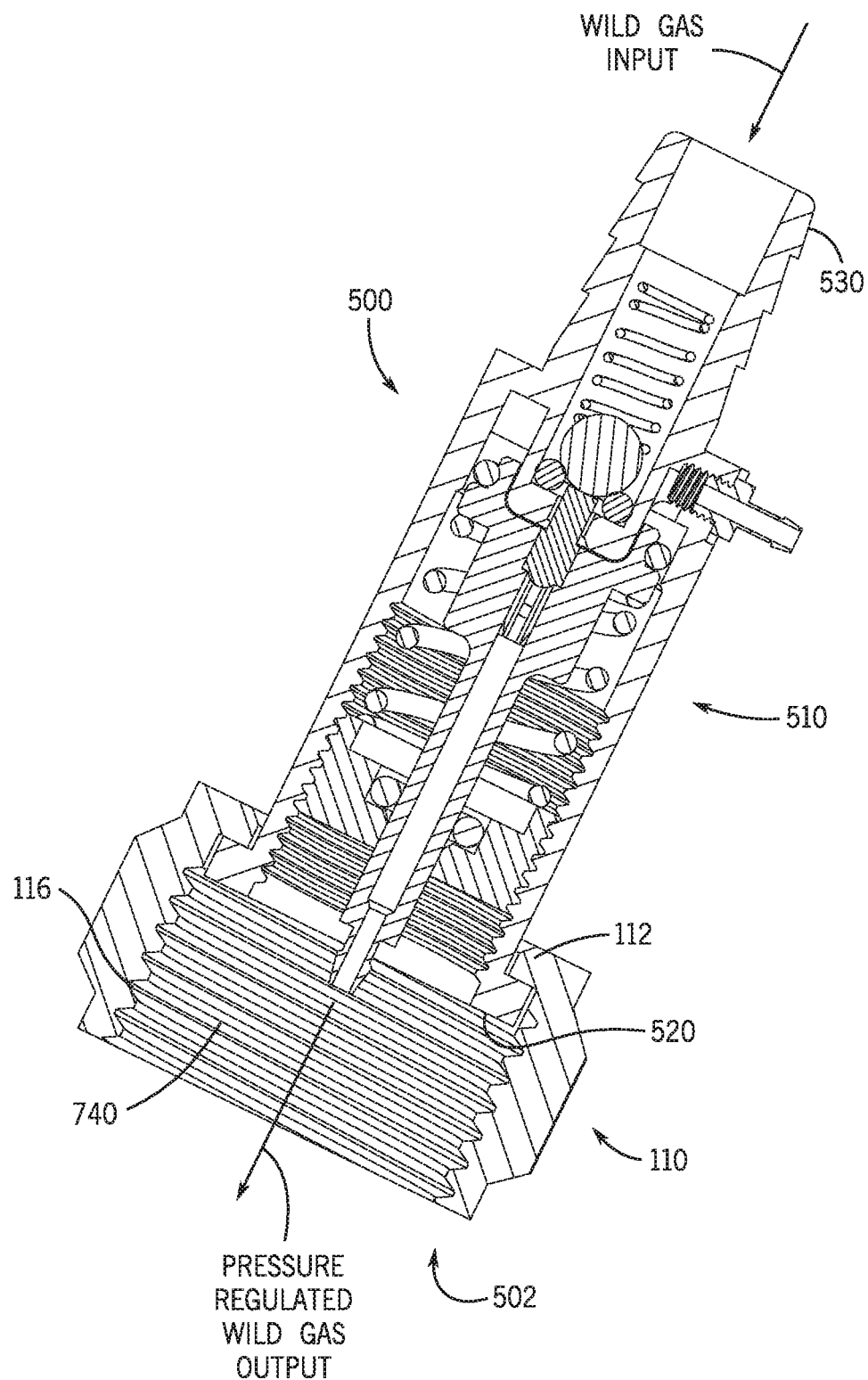
FIG. 5B is a cross-sectional view of Applicants' secondary regulator 500.

FIG. 5B illustrates assembly 502 comprising Applicants' secondary regulator 500 in combination with hex nut 110 (FIG. 4B). The captured "wild" gas is input into portion 530 of secondary regulator 500. Pressure regulated output gas is discharged from secondary regulator 500 in section 740. Internal threading 116 formed in an aperture extending through hex nut 110 is used to couple assembly 502 to a gas feed line for a pump to be driven using the captured "wild" gas.

As a general matter, Applicants' secondary pressure regulator can regulate any gas. In certain embodiments, o-rings disposed within Applicants' secondary pressure regulator must be selected to be compatible with the gas being regulated.

Generally among draught beer systems there are four types based on equipment and design: direct-draw systems, short-draw systems, long-draw systems, and picnic pumps. Draught systems use $CO_2$ alone or mixed with nitrogen in varying proportions depending on the requirements of the system and the beers being served. When properly selected and set, dispense gas maintains the correct carbonation in the beer and helps to preserve its flavor. In most draught systems, the dispense gas also propels beer from a keg to a faucet.

As a general matter, $CO_2$ gas is supplied in a variety of cylinder sizes ranging from about 30 pounds to about 150 pounds and containing about 10 to about 60 pounds of gas, respectively. The pressure in such cylinders ranges from about 750 PSIG at 72 F to about 1800 PSIG at ~122 F which activates a burst disc that releases all the gas in the cylinder. A primary regulator attached to the $CO_2$ cylinder reduces the source pressure to an intermediate pressure of about 20 PSIG to about 45 PSIG. Applicants' secondary regulator described hereinbelow receives $CO_2$ gas having a pressure of about 4-35 PSIG from a primary regulator, and reduces that pressure to about 5 to about 18 PSIG. Individual dispense pressures are recommended for various brands/types of draught beer plus altitude and system length require additional push pressure.

Consistent and controlled beer dispense requires that the beer traveling from keg to glass be maintained at a temperature of 30° to 44° F. A cooling system should hold beer at a constant temperature from keg to glass. Any increase in beer temperature between the cooler and the faucet can lead to dispense problems such as foaming.

In a simple direct-draw system, a refrigerated cabinet maintains the temperature of the keg and provides cooling to the beer as it travels the short distance to the faucet. Many long-draw systems use a walk-in refrigerator to cool the kegs, plus chilled glycol that circulates in tubes next to the beer lines all the way to the faucet, to ensure that the beer stays cold all the way to the glass.

Figure 1:
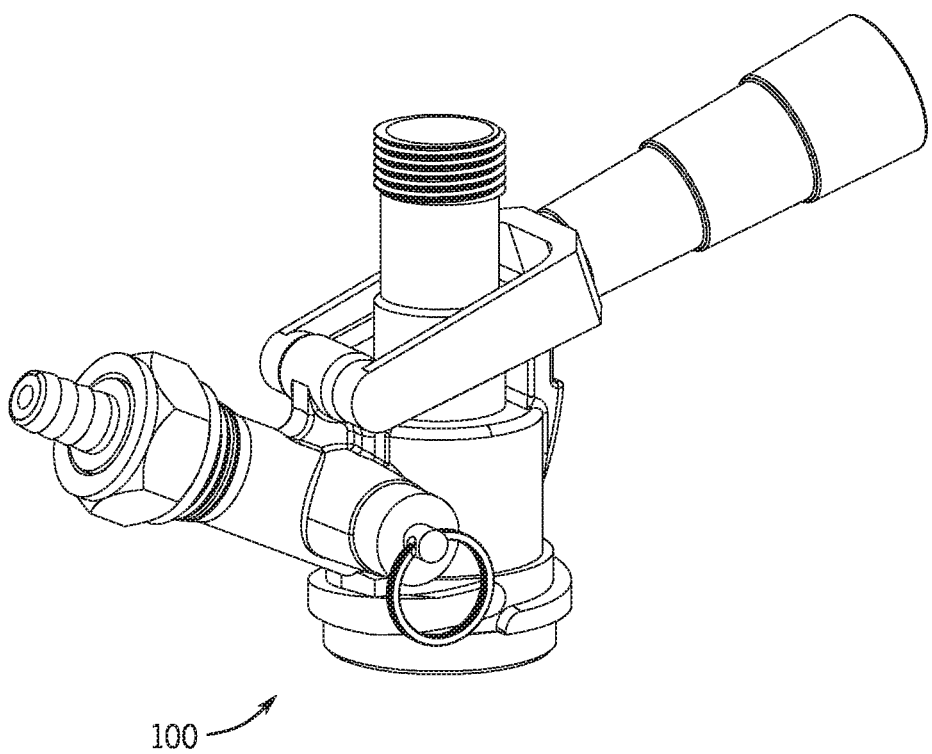
FIG. 1 illustrates a prior art keg coupler 100.
Figure 2:
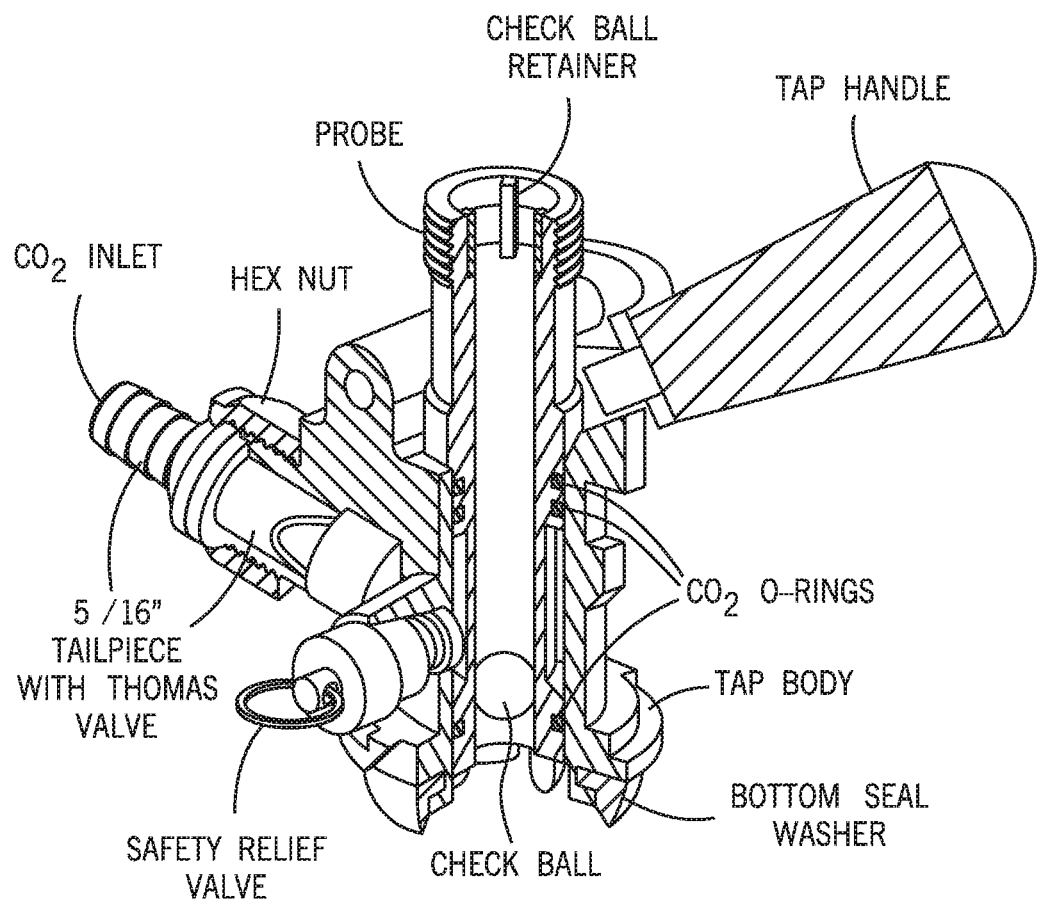
FIG. 2 illustrates the components comprising keg coupler 100.
Figure 3:
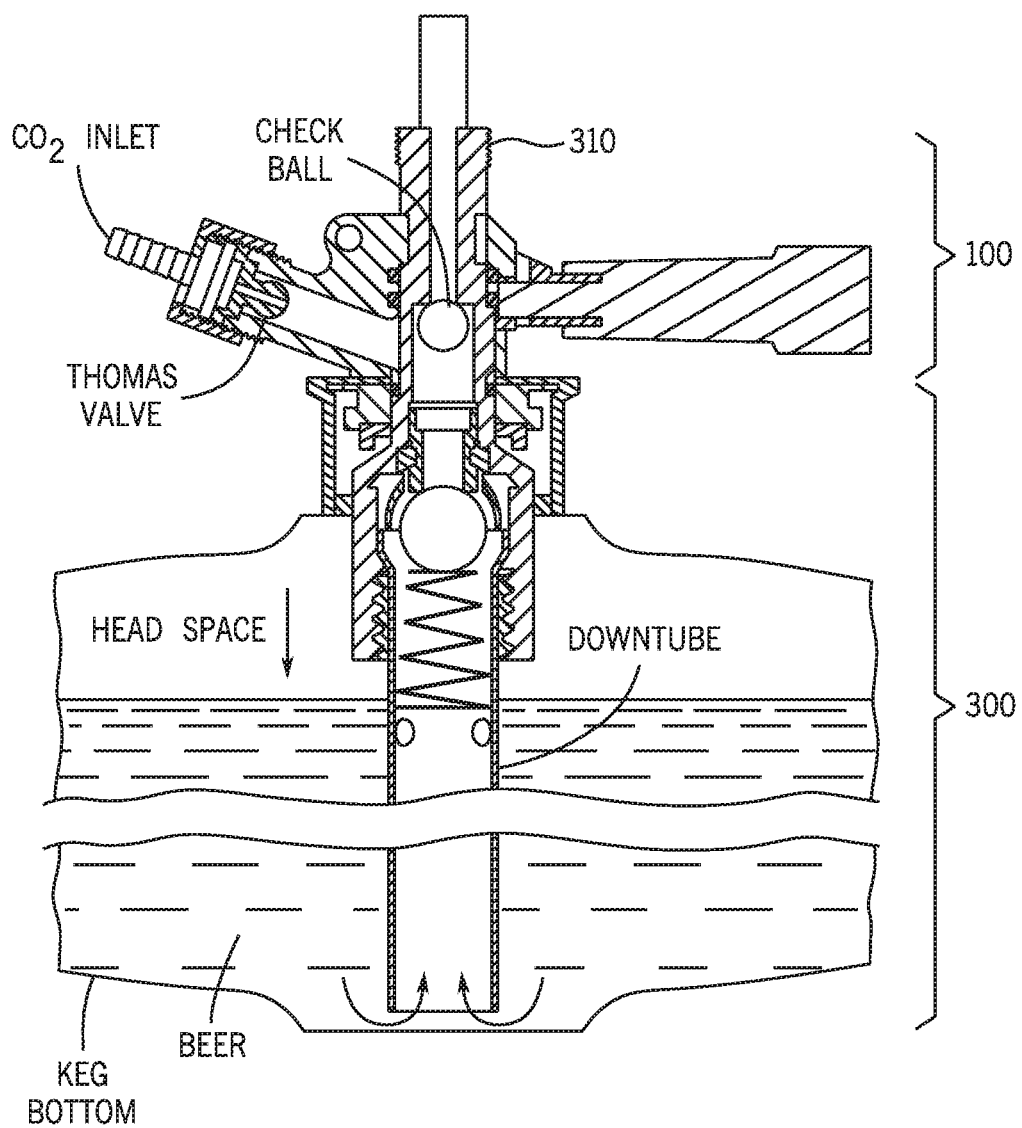
FIG. 3 illustrates keg coupler 100 releaseably attached to a beer keg 300.

Referring now to FIGS. 1, 2, and 3, gas flows in and beer flows out of a keg through a coupler 100. While this device has many casual names in beer cellars around the country, the industry adopted the term "coupler" as the standard term for the device.

Most U.S. breweries use a Sankey "D" coupler. FIG. 1 illustrates a Sankey "D" coupler. FIG. 2 recites a cut-away view of a Sankey "D" coupler thereby illustrating the components therein. FIG. 3 illustrates a Sankey "D" coupler releaseably mounted on a beer keg.

Kegs are pressurized vessels. Nearly all modern kegs use some form of Sankey valve and stem. There are two main types of Sankey valves and corresponding keg necks: "drop-in," and threaded. Drop-in Sankey valves are held in place by a lock ring or circlip. The lock ring and valve should never be removed in the field. Very rarely a lock ring can fail, possibly loosening the valve, creating a potentially dangerous situation. Threaded Sankey valves screw into the neck of the keg.

When a coupler is attached to a keg to tap it, a probe on the bottom depresses a ball or poppet in the key valve, allowing $CO_2$ or mixed gas to enter the keg thereby applying pressure to the beer. This forces the beer to travel up the down tube (spear) and drive the beer to the faucet. The coupler is attached to a jumper or a beer line 310 (FIG. 3).

Couplers included two types of one-way valves, namely a Thomas valve and/or a check valve. A Thomas valve allows $CO_2$ to flow into the keg but prevents the beer from backing up into the gas line if gas pressure drops. This protects the gas regulators from damage. When the coupler is disconnected from the keg, a check valve prevents beer from the beer line flowing out through the coupler. This prevents beer spillage in keg tapping areas.

A keg coupler should also contain an integral pressure relief valve. If excessive gas pressure were applied to a keg, this valve would open to prevent damage to the keg and coupler. The valve can also be opened manually, and this should be done periodically to test the safety relief valve. The manual release usually looks like a small metal pin fitted with a wire ring. To test the valve, pull on the ring to slide the pin a short distance out of the coupler and release a small amount of gas.

FIG. 4A illustrates Sankey "D" coupler 100 comprising a tail piece 120 and a hex nut 110. FIG. 4B illustrates hex nut 110. Hex nut 110 is formed to include an aperture extending therethrough. Hex nut 110 further comprises an annular lip extending inwardly into that aperture on both ends of the device. The hex nut aperture comprises a diameter 114 at the annular lips 112.

Figure 4C:
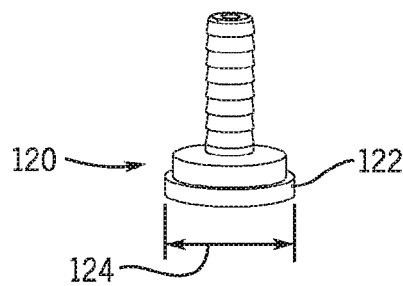
FIG. 4C illustrates tail piece 120 separately.

FIG. 4C illustrates tail piece 120. Tail piece 120 comprises an annular base 122. Annular base comprises a diameter 124. Diameter 124 is greater than diameter 114 of annular lip 112 on hex nut 110 (FIG. 4B).

FIG. 5A illustrates one embodiment of Applicants' secondary regulator 500. In the illustrated embodiment of FIG. 5, secondary regulator 500 comprises a cylindrical body 510 and an integral tail piece 530. In the illustrated embodiment of FIG. 5, Applicants' secondary regulator further comprises an annular lip 520 on a proximal end. In certain embodiments, annular lip 520 comprises a diameter 540, wherein diameter 540 is greater than diameter 114 of annular lip 112 on hex nut 110 (FIG. 4B).

Figure 6:
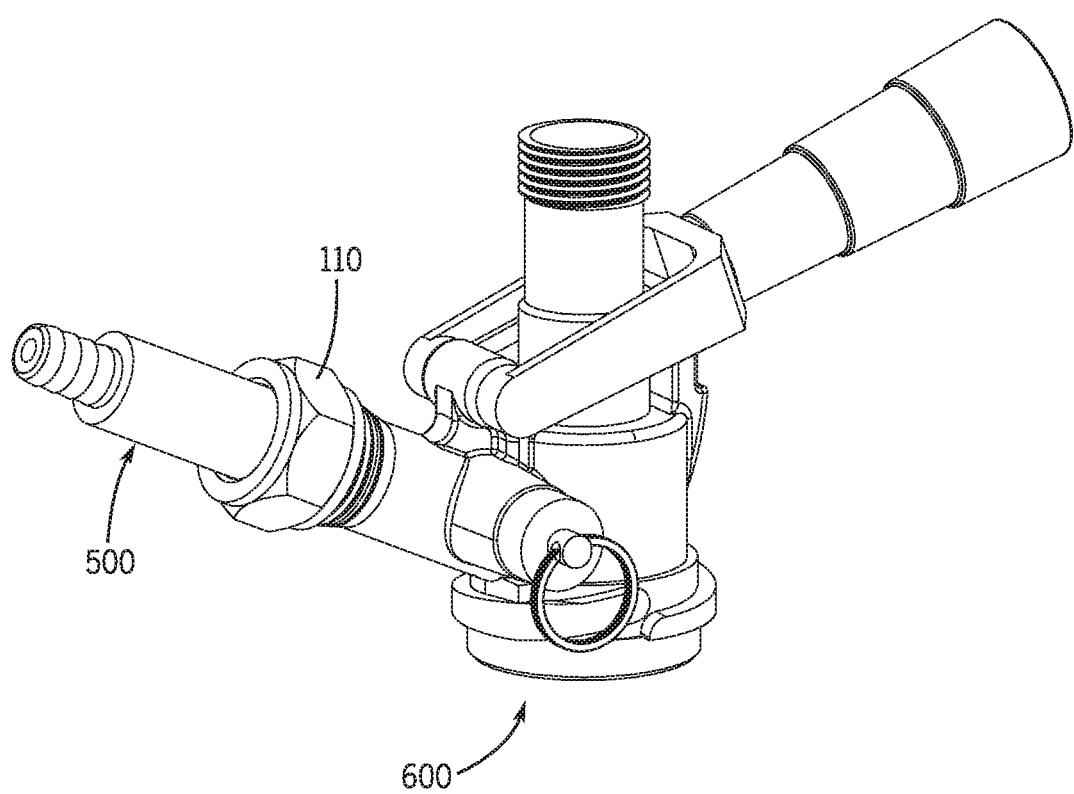
FIG. 6 illustrates Applicants' keg coupler 600.

FIG. 6 illustrates Applicants' keg coupler 600 which includes Applicants' secondary regulator 500 releaseably attached to Sankey "D" keg coupler. Referring now to FIGS. 4A, 4B, 4C, 5 and 6, hex nut 110 is removed from prior art Sankey keg coupler 100, and tail piece 120 is removed from hex nut 110. The distal end of Applicants' secondary regulator 500 is inserted into and through hex nut 110 until annular lip 520 is in contact with annular lip 112. Hex nut 110 is then releaseably attached to Sankey keg coupler 100 to give Applicants' keg coupler 600 (FIG. 6).

Figure 7A:
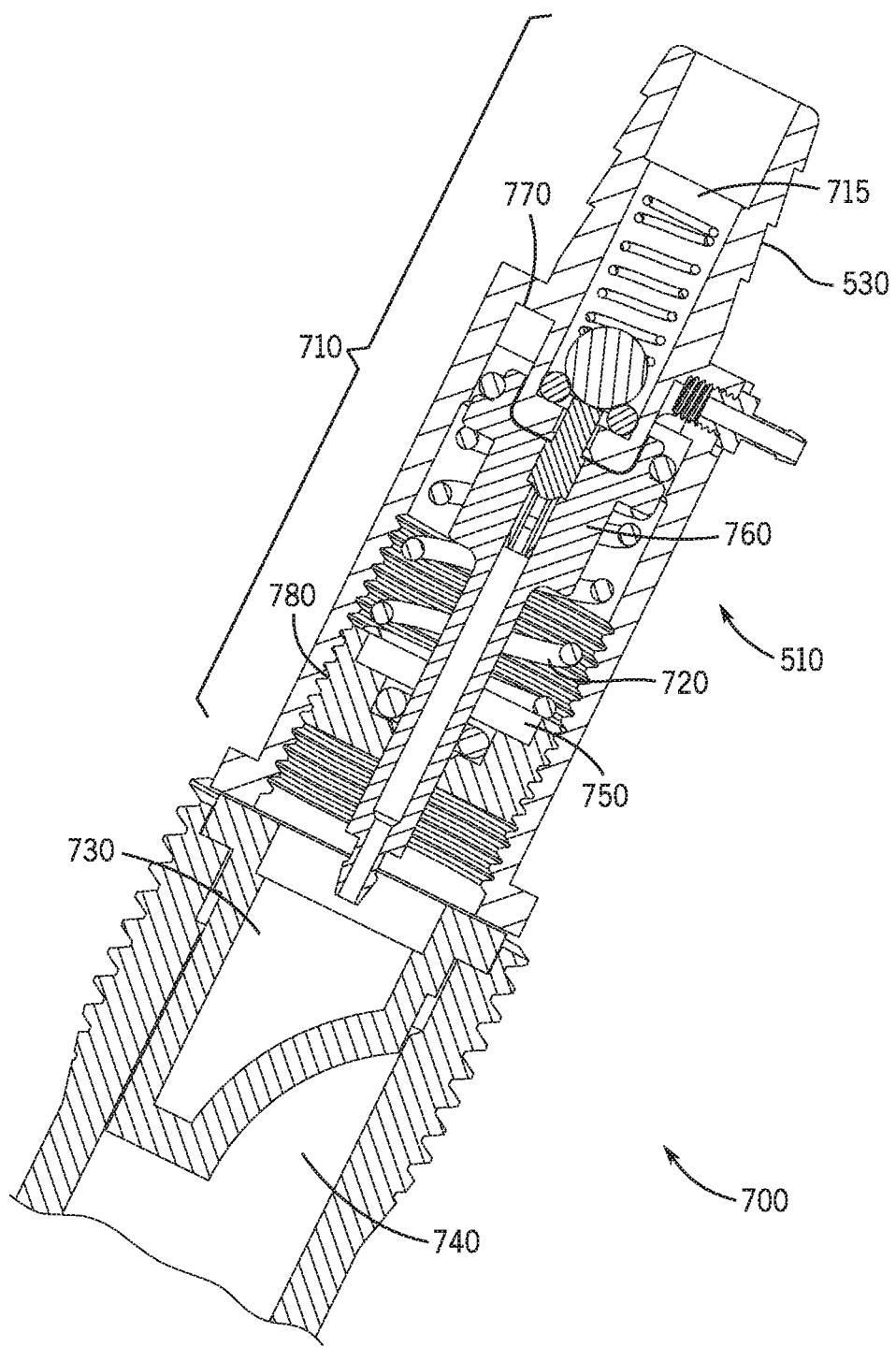
FIG. 7A illustrates Applicants' secondary regulator 700 in cross-section.

FIG. 7A illustrates one embodiment of Applicants' secondary regulator 700. Regulator 700 comprises distal portion 710 which includes integral tail piece 530. Distal portion 710 comprises an input section for Applicants' secondary regulator 700. Portion 715 comprises a high pressure area in regulator 700. Thomas valve 730 is disposed in low pressure portion 740.

Applicants have found that Increasing a diameter of Secondary Regulator 500/700 increases a gas volume throughput. As a general matter, the greater the diameter of Secondary Regulator 500/700, the less accurate that secondary regulator is with respect to desired output pressure, but the greater the volume of gas that flows through the regulator. On the other hand, the smaller the diameter of Secondary Regulator 500/700, the more accurate the Secondary Pressure Regulator is with respect to desired output pressure at lower pressure settings.

Referring now to FIGS. 5, 7A, 7B, 7C, and 7D, Applicants' pressure regulator 700 comprises housing 510, piston 760 moveably disposed within housing 510 wherein piston 760 is formed to include an annular lip 762, compression spring 720, and adjustment cap 750. Spring 720 is disposed between annular lip 520 and adjustment cap 750.

Figure 7B:
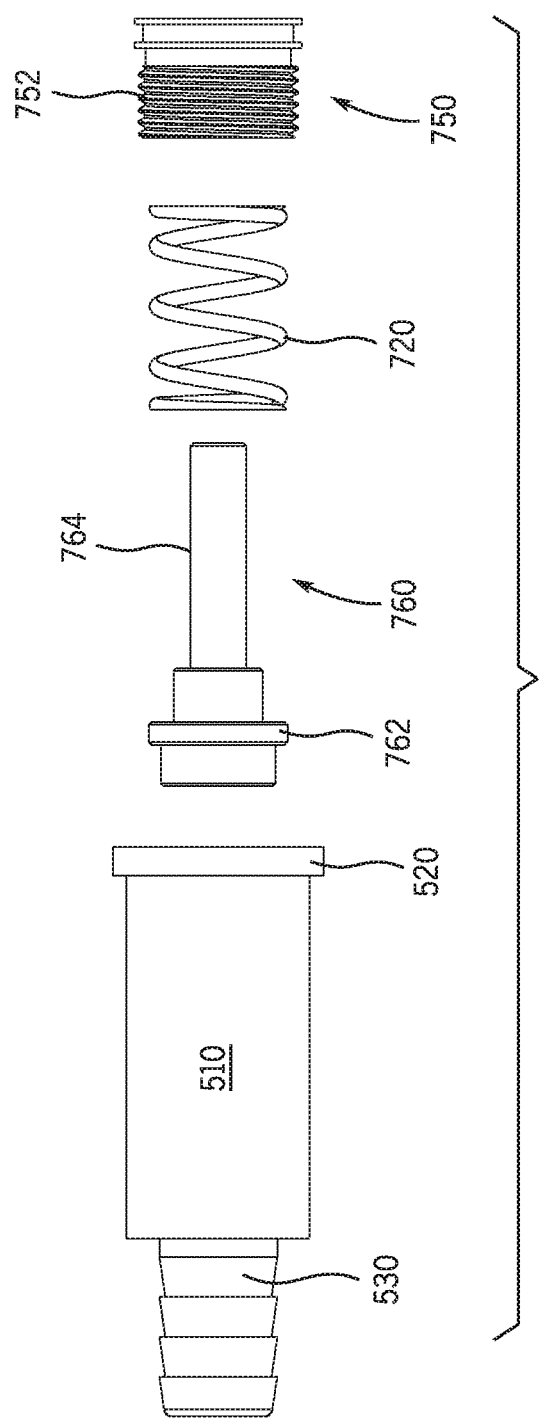
FIG. 7B illustrates certain elements of Applicants' secondary regulator 700.
Figure 7C:
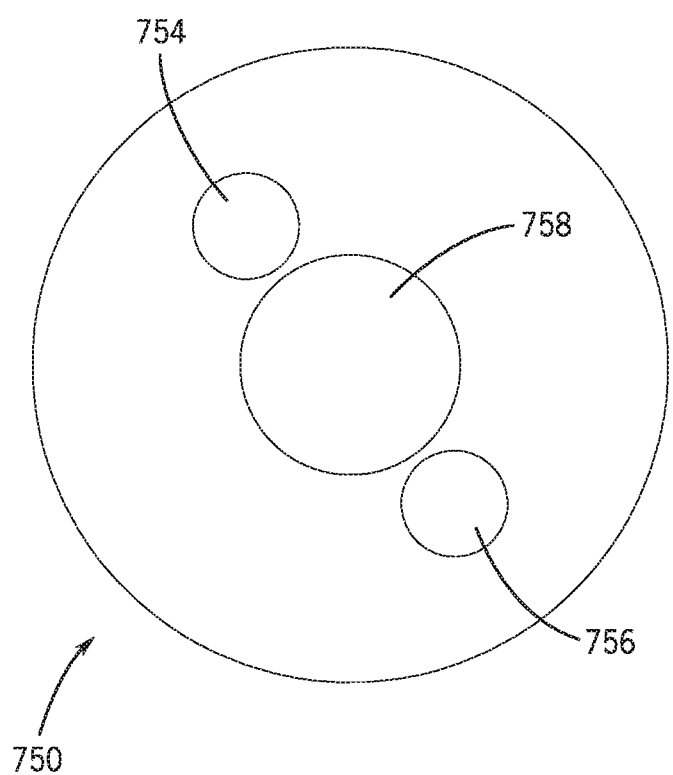
FIG. 7C illustrates a top view of Applicants' adjustment cap 750 disposed within Applicants' secondary regulator 700.
Figure 7D:
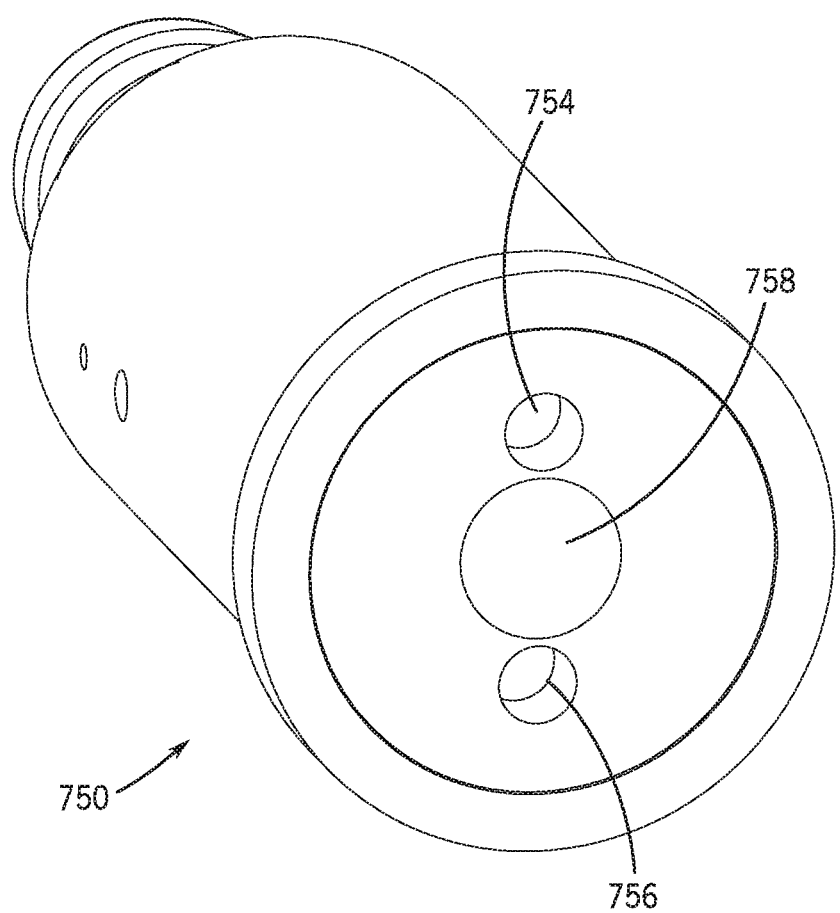
FIG. 7D illustrates a perspective view of the adjustment cap 750 of FIG. 7C.

Referring now to FIGS. 7B, 7C, and 7D, adjustment cap 750 is formed to include threading] adjacent a first end thereof. Threading 752 is configured to mesh with internal threading 780 (FIG. 7A).

Compression spring 720 determines the regulated output pressure in portion 740. Rotating adjustment cap in a first direction compresses spring 720, and increases the output pressure in region 740 (FIG. 7A) of regulator 700. Rotating adjustment cap in a second and opposite direction decompresses spring 720, and decreases the output pressure in region 740 (FIG. 7A) of regulator 700.

Adjustment cap 750 is further formed to include key slots 754 and 756 which extend inwardly in a second end thereof. Adjustment cap 750 is further formed to include an aperture 758 extending therethrough. Shaft 764 of piston 760 passes through aperture 758.

In certain embodiments, the dispense pressure is variable based upon, for example and without limitation, an elevation for the dispense system, a measured atmospheric pressure, and a measured humidity. In certain embodiments, Applicants' secondary regulator further comprises a controller comprising a programmable processor, a computer-readable medium, and a database/look-up tables encoded in the computer-readable medium.

In these embodiments, Applicants' dispense system further comprises an elevation sensor, an atmospheric pressure sensor, and a humidity sensor. In certain embodiments, the controller, the elevation sensor, the atmospheric pressure sensor, and the humidity sensor, are disposed within cylindrical housing 510 (FIG. 5). In certain embodiments, the processor receives signals from the elevation sensor, the atmospheric pressure sensor, and the humidity sensor, and based upon a measured input pressure and information the controller retrieves from the database/look-up tables, the processor calculates a nominal dispense pressure, and adjusts the compression of spring 720 (FIG. 7) to achieve that nominal dispense pressure in low pressure portion 740 (FIG. 7) of secondary regulator 700 (FIG. 7).

Figure 12A:
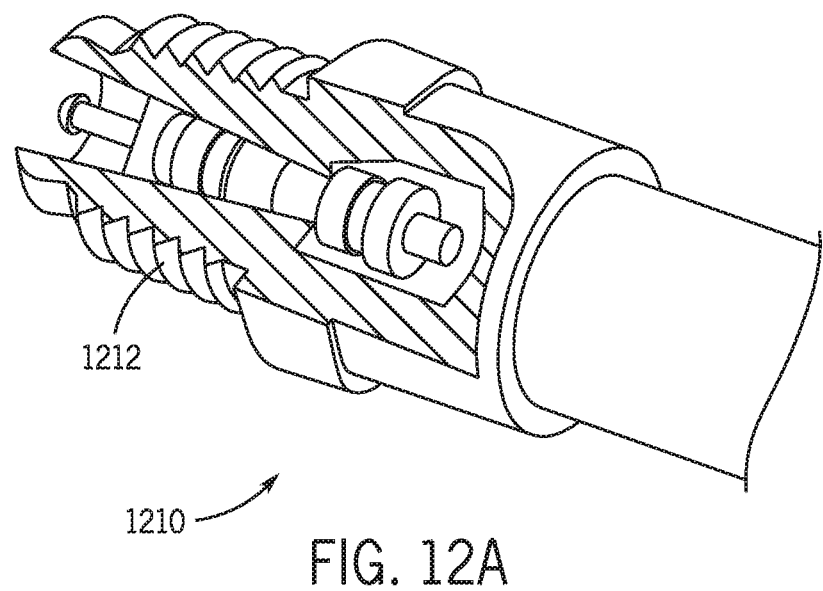
FIG. 12A illustrates a cut-away view of a Schrader valve.

FIG. 12A illustrates a Schrader valve 1210. The Schrader valve (also called American valve) is a type of pneumatic valve used on virtually every motor vehicle in the world today. The Schrader company, for which it was named, was founded in 1844 by August Schrader. The Schrader valve includes a valve stem into which a valve core is threaded. The valve core is a poppet valve assisted by a spring.

Figure 12B:
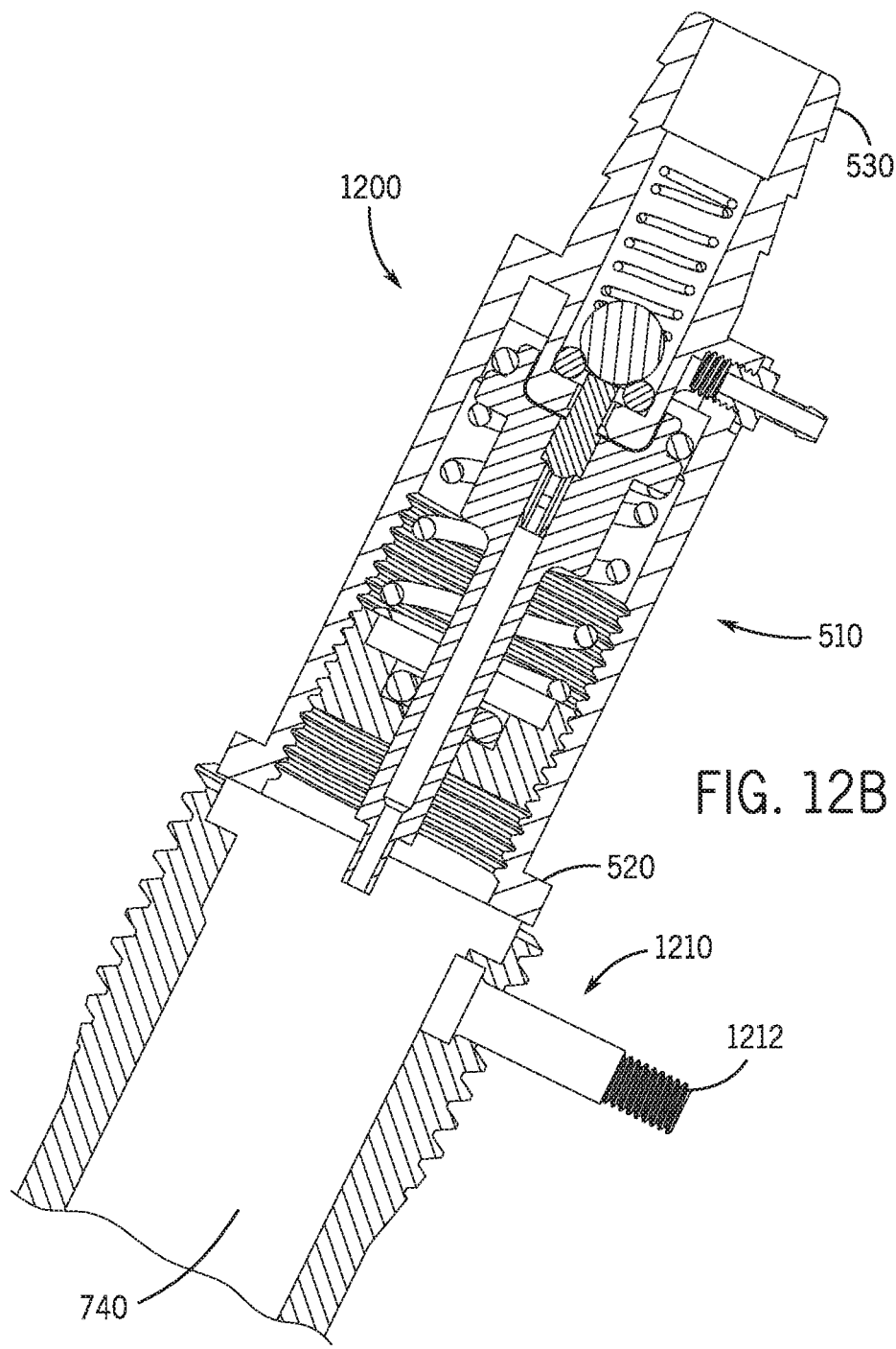
FIG. 12B is an embodiment wherein Applicants' secondary regulator 1200 includes a Schrader valve in fluid communication with a low pressure region thereof.

Referring now to FIGS. 12A and 12B, Applicants' secondary regulator 1200 comprises the elements of Applicants' secondary regulator 700 (FIG. 7A) in combination with a Schrader valve 1210, wherein Schrader valve 1210 is in fluid communication with regulated output pressure region 740. A typical tire gauge can be releaseably attached to threaded end 1212 to determine the actual regulated pressure in region 740 without disconnecting Applicants' secondary regulator 1200 from a direct draw system, a short draw system, and/or a long draw system.

Figure 8:
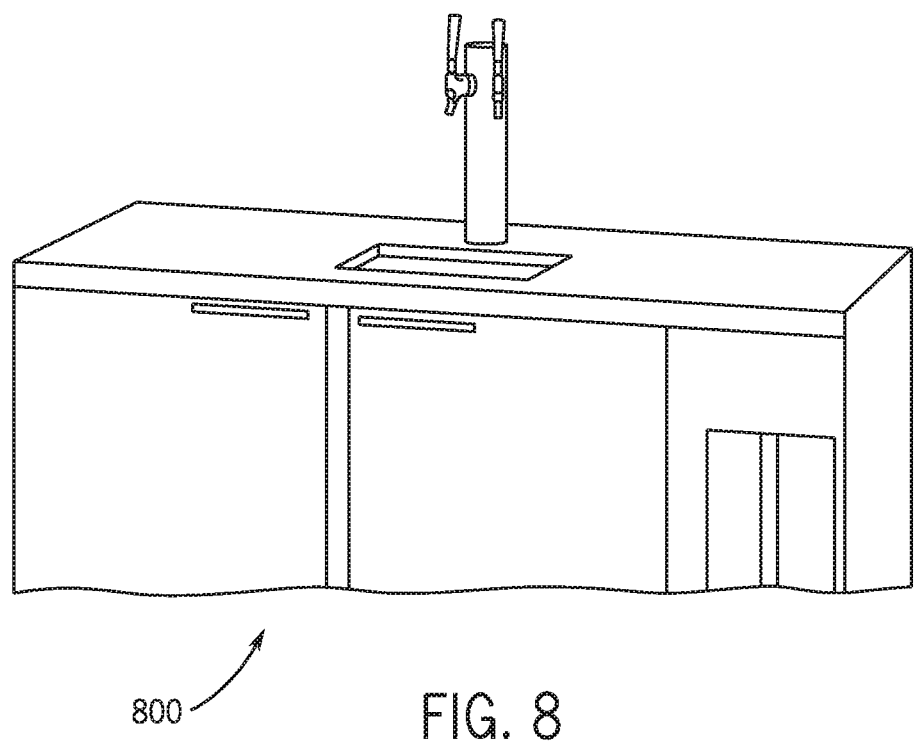
FIG. 8 illustrates a direct draw system 800.

Referring now to FIG. 8, in certain embodiments Applicants' keg coupler 600 can be utilized in a direct draw system 800. In the illustrated direct draw system comprising a single faucet, a single keg coupler 600 would be utilized to optimize the pour pressure for the beer being served.

Figure 9:
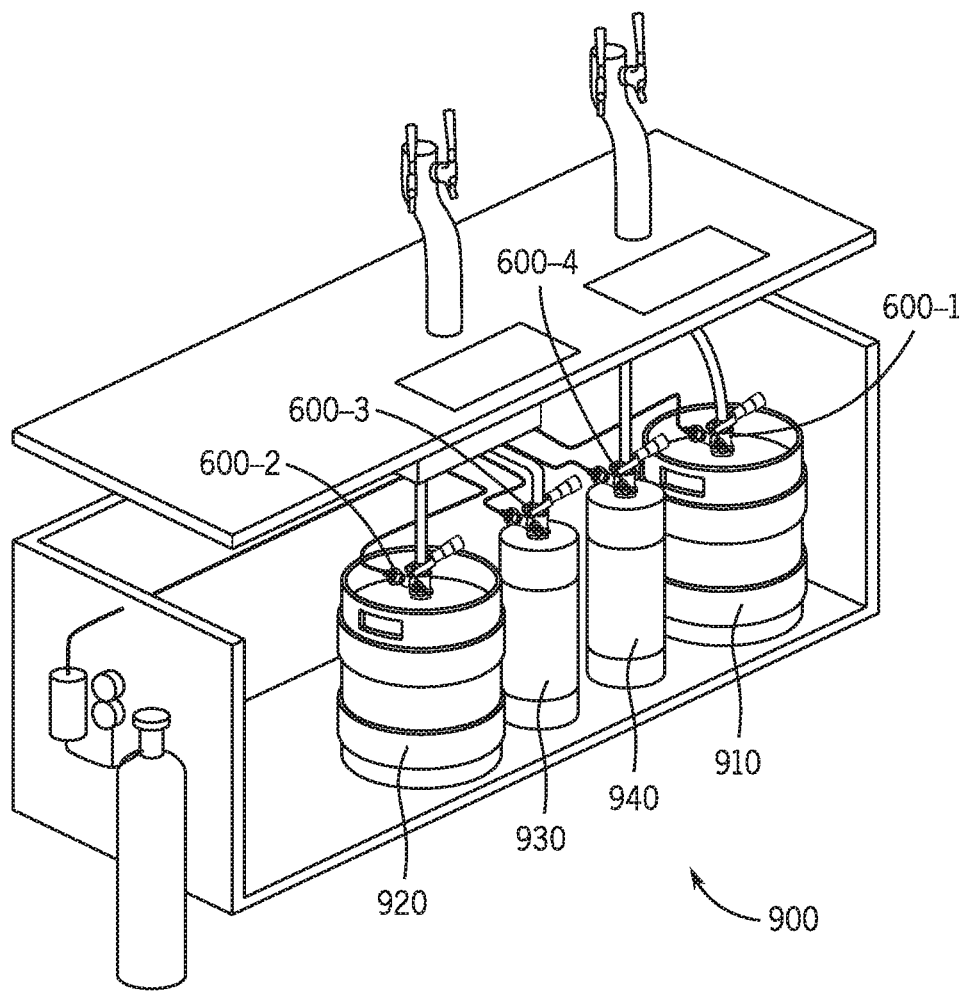
FIG. 9 illustrates a short draw system 900.

Referring now to FIG. 9, in certain embodiments Applicants' keg coupler 600 can be utilized in a short draw system 900. In the illustrated short draw system comprising four kegs and four faucets, keg 910 contains a first beer, keg 920 contains a second beer, keg 930 contains a third beer, and keg 940 contains a fourth beer. Kegs 930 and 940 are known as $\frac{1}{6}^{th}$ Barrels containing $\frac{1}{6}^{th}$ of a 31 gallon keg. Applicants' keg coupler 600-1 is utilized with keg 910, and a different keg coupler 600-2 is utilized with keg 920, and a different keg coupler 600-3 is utilized with keg 930, and a different keg coupler 600-4 is utilized with keg 940. In certain embodiments, the resulting dispense pressure for kegs 910, 920, 930, and 940, differ.

Figure 10:
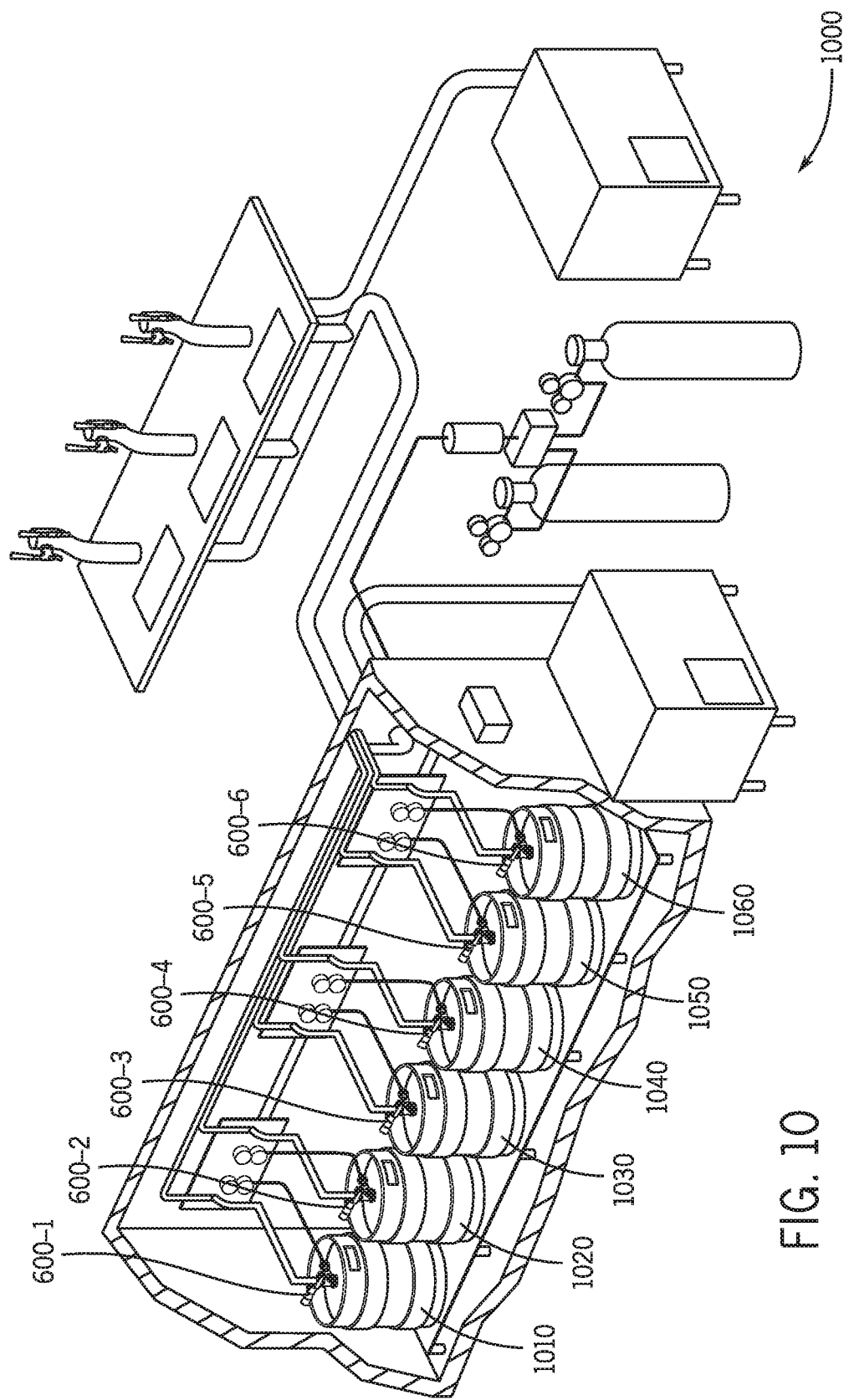
FIG. 10 illustrates a long draw system 1000.

Referring now to FIG. 10, in certain embodiments Applicants' keg coupler 600 can be utilized in a long draw system 1000. In the illustrated short draw system comprising a six kegs and six faucets. Keg 1010 contains a first beer, and keg coupler 600-1 is used. Keg 1020 contains a second beer, and keg coupler 600-2 is used. Keg 1030 contains a third beer, and keg coupler 600-3 is used. Keg 1040 contains a fourth beer, and keg coupler 600-4 is used. Keg 1050 contains a fifth beer, and keg coupler 600-5 is used. Keg 1060 contains a sixth beer, and keg coupler 600-6 is used. In certain embodiments, the resulting dispense pressure for kegs 1010, 1020, 1030, 1040, 1050, and 1060 differ.

During a single day event it is not uncommon to simply tap a keg with a "picnic pump" and dispense the beer using air. While this is not an ideal draught beer dispense solution it is nonetheless a practice that is widely accepted. Under these conditions, a draught beer keg will not go "off-taste" for at least 6 hours; however, 12-18 hours later that same beer will be nearly undrinkable. Aside from beer quality issues, over pressurization is common as the practice is to pump the keg then draw beer into a cup or glass. Currently, there is no regulation system built into this draught beer dispense equipment.

Figure 11:
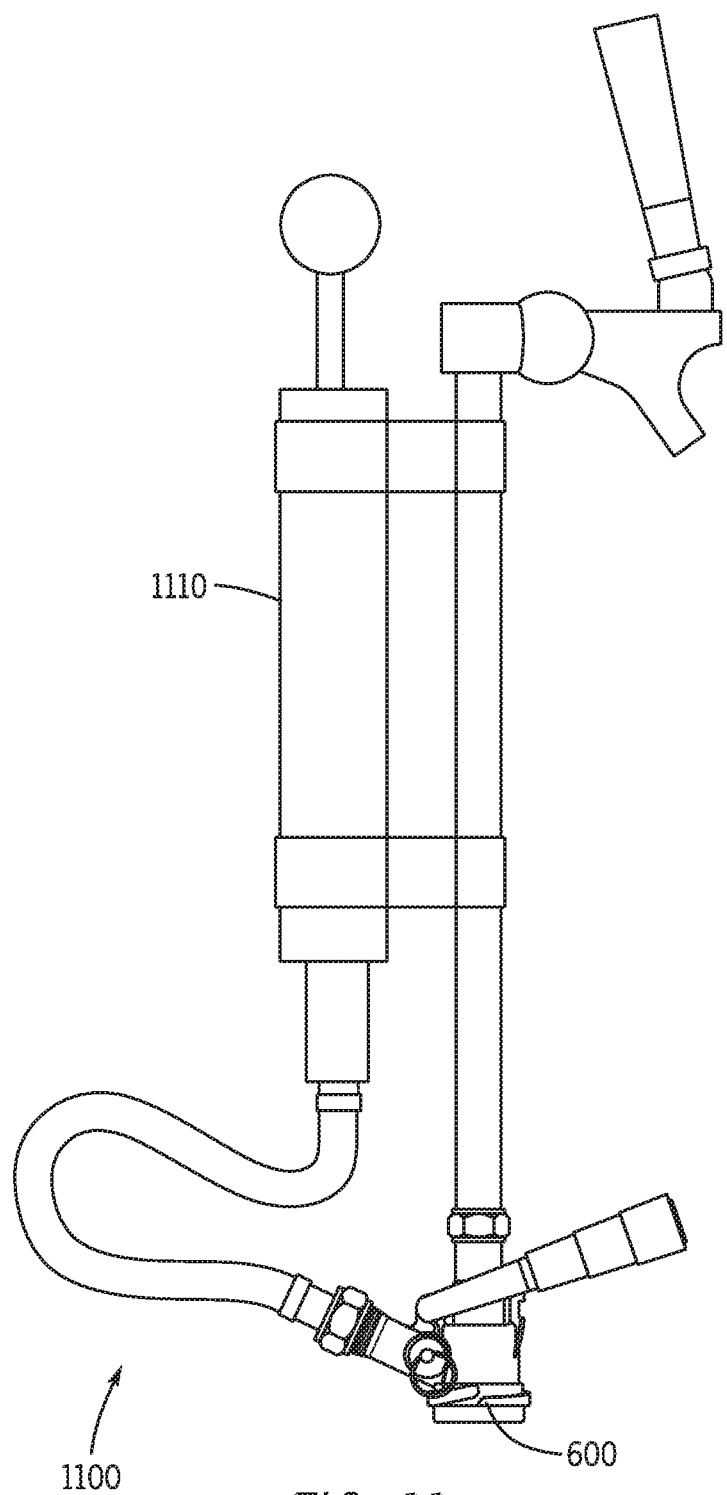
FIG. 11 illustrates a "picnic pump" device which incorporates Applicants' keg coupler therein.

Referring now to FIG. 11, in another embodiment Applicants' keg coupler 600 is integrated into picnic pump 1100 to prevent over pressurization of the beer, which contributes to foaming issues. By allowing the keg to be manually pumped using air pump 1110, but restricting additional pressure into the keg at the prescribed pressure for a specific style of beer, the invention allows the gratification of pumping the keg before dispensing a cup or glass of beer without over pressurizing the keg.

Table 1 recites pre-set output pressures for different embodiments of Applicants' keg coupler 600. A typical input pressure for each of these embodiments is between about 20 PSIG to about 35 PSIG.

TABLE 1

| OUTPUT PRESSURE, PSIG | BEVERAGE TYPE | SEA LEVEL | HIGH ALTITUDE |
|---|---|---|---|
| 5 | Wine, Kombucha, Pre-Mixed Cocktails | | |
| 12 | Craft Ales | 2.5 Volumes | |
| 14 | Lagers | 2.7 Volumes | |
| 16 | High Carbonation Belgiums | 3.0 Volumes | 2.5 Volumes - Craft Ales |
| 18 | HEFEWEISEN | 3.0+ Volumes | 2.7 Volumes - Lagers |
| 21 | Long Draw Draught Beer | | |
| 23 | Long Draw Draught Beer | | |
| 25 | Long Draw Draught Beer | | |
| 27 | Long Draw Draught Beer | | |

Primary Regulator Supporting Secondary Regulator

In another embodiment, Applicants' regulator 500/700 is used as a primary regulator connecting to the $CO_2$ bottle. When using a secondary regulator, gauges on the $CO_2$ cylinder become obsolete as the flow through pressure merely needs to be approximately 35 psig and does not need to be shown on a pressure gauge.

The high pressure gauge does not contribute to draught beer dispense as it shows high pressure until the $CO_2$ bottle is nearly empty. This is akin to a fuel gauge in a car reading full until you're 20 miles from home at which time it indicates that you are empty.

A sensor or scale can be used to determine a weight of a full cylinder of gas and then monitor that weight until empty. For example, a 10 lb. cylinder (empty) weights 15 lbs. When filled with 10 lbs. of $CO_2$ it weights 25 lbs. A simple scale of percentages would indicate that a bottle was 100% full at 25 lbs, 50% full at 20 lbs, and 5% full at 15.5 lbs. This information/alert would allow for a bottle replacement well before the $CO_2$ cylinder ran empty during a busy bar night.

Gas Blending Supporting Secondary Regulator
($CO_2$ Mixed with Nitrogen)

In another embodiment, a mixture of $CO_2$ and Nitrogen gases are used. A primary regulator attached to a $CO_2$ cylinder set at 35 psig, a $CO_2$ hose carries the $CO_2$ gas to another embodiment of the Secondary Regulator. A primary regulator attached to a Nitrogen cylinder set at 35 psig, a Nitrogen hose carries the Nitrogen Gas to another embodiment of the Secondary Regulator.

A 75%/25% blend by volume of $CO_2$ to Nitrogen is achieved by setting the $CO_2$ Secondary Regulator embodiment to 75% (or ¾ flow) and setting the Nitrogen Secondary Regulator embodiment to 25% (or ¼ flow). Both gasses mix in a chamber and pass to the next secondary regulator at the keg coupler.

A 60%/40% blend of $CO_2$ to Nitrogen is achieved by setting the $CO_2$ Secondary Regulator embodiment to 60% (or ⅗ flow) and setting the Nitrogen Secondary Regulator embodiment to 40% (or ⅖ flow). Both gasses mix in a chamber and pass to the next secondary regulator at the keg coupler.

While the preferred embodiments of the present invention have been illustrated in detail, it should be apparent that modifications and adaptations to those embodiments may occur to one skilled in the art without departing from the scope of the present invention as set forth herein.

We claim:

1. A pressure regulator comprising:
   a housing formed to include a bore therein;
   a piston moveably disposed within said bore; wherein said piston comprises an annular lip adjacent a first end thereof;
   a spring disposed within said bore, and comprising a first end and a second end;
   an adjustment cap moveably disposed in said bore wherein said adjustment cap is formed to include a plurality of key slots formed therein;
   wherein:
   said first end of said spring is in physical contact with said annular lip; and
   said second end of said first spring is in physical contact with said adjustment cap.

2. The pressure regulator of claim 1, wherein:
   said bore is defined by a cylindrical wall;
   said cylindrical wall is formed to include first threading therein.

3. The pressure regulator of claim 2, wherein:
   said adjustment cap is formed to include second threading formed on a periphery thereof;
   said second threading is configured to mesh with said first threading.

4. The pressure regulator of claim 3, wherein:
   rotating said adjustment cap in a first direction causes said adjustment cap to compress said first spring;
   rotating said adjustment cap in a second and opposite direction causes said adjustment cap to decompress said first spring.

5. The pressure regulator of claim 4, wherein:
   rotating said adjustment cap in said first direction increases the output pressure of the pressure regulator;
   rotating aid adjustment cap in said second direction decreases the output pressure of the pressure regulator.

6. The pressure regulator of claim 1, wherein said adjustment cap is further formed to include an aperture extending therethrough.

7. The pressure regulator of claim 6, wherein:
   said piston comprises a piston shaft;
   said piston shaft, passes through said aperture.

8. The pressure regulator of claim 1, wherein:
   said housing comprises an integral tail piece disposed on an input end;
   said housing comprises a first annular lip disposed on an output end.

9. An assembly, comprising:
   a pressure regulator comprising a first housing formed to include a bore therein, a piston moveably disposed within said bore wherein said piston comprises a first annular lip adjacent a first end, a spring disposed within said bore and comprising a first end and a second end, an adjustment cap disposed in said bore, wherein said first end of said first spring is in physical contact with said first annular lip and said second end of said first spring is in physical contact with said adjustment cap;
   a keg coupler comprising a second housing, wherein said second housing is configured to releaseably attach a tail piece using a hex nut comprising an annular lip and formed to include an aperture extending therethrough, said hex nut further comprising threading formed on a wall defining said aperture;

wherein said hex nut releaseably attaches said output end of said pressure regulator to said second housing.

10. The assembly of claim 9, wherein:
said bore is defined by a cylindrical wall;
said cylindrical wall is formed to include first threading therein.

11. The assembly of claim 10, wherein:
said adjustment cap is formed to include second threading adjacent a first end;
said second threading is configured to mesh with said first threading.

12. The assembly of claim 11, wherein:
rotating said adjustment cap in a first direction causes said adjustment cap to compress said first spring;
rotating said adjustment cap in a second, and opposite, direction causes said adjustment cap to decompress said first spring.

13. The assembly of claim 12, wherein:
rotating said adjustment cap in said first direction increases the output pressure of the pressure regulator;
rotating said adjustment cap in said second direction decreases the output pressure of the pressure regulator.

14. The assembly of claim 13, wherein said adjuster cap is formed to include a corresponding plurality of key slots formed therein.

15. The assembly of claim 14, wherein said adjustment cap is further formed to include an aperture extending therethrough.

16. The assembly of claim 15, wherein:
said piston comprises a piston shaft;
said piston shaft passes through said aperture.

17. The assembly of claim 9, wherein:
said first housing comprises an integral tail piece disposed on an input end;
said first housing comprises a first annular lip disposed on an output end.

* * * * *